| (12) | United States Patent | (10) Patent No.: | US 8,905,599 B2 |
|---|---|---|---|
| | Shum | (45) Date of Patent: | Dec. 9, 2014 |

(54) STROBE ZOOM DEVICE

(75) Inventor: Tak Wah Shum, North Point (CN)

(73) Assignees: Nissin Industries Ltd., Hong Kong (CN); Chikara GOTO, Tokyo (JP)

( * ) Notice: Subject to any disclaimer, the term of this patent is extended or adjusted under 35 U.S.C. 154(b) by 31 days.

(21) Appl. No.: 13/819,543

(22) PCT Filed: Jun. 16, 2011

(86) PCT No.: PCT/JP2011/003423
§ 371 (c)(1),
(2), (4) Date: Feb. 27, 2013

(87) PCT Pub. No.: WO2012/035687
PCT Pub. Date: Mar. 22, 2012

(65) Prior Publication Data
US 2013/0163257 A1   Jun. 27, 2013

(30) Foreign Application Priority Data

Sep. 17, 2010   (JP) ................................ 2010-208861

(51) Int. Cl.
*F21V 17/02*   (2006.01)
*F21V 5/04*   (2006.01)
*G03B 15/03*   (2006.01)
*G03B 15/05*   (2006.01)

(52) U.S. Cl.
CPC . *F21V 17/02* (2013.01); *F21V 5/04* (2013.01); *G03B 15/03* (2013.01); *G03B 15/05* (2013.01)
USPC ........................................................ 362/319

(58) Field of Classification Search
CPC ....... F21V 14/006; F21V 14/02; F21V 14/06; F21V 17/02; F21V 17/12; F21V 19/02; F21Y 2103/00; G03B 15/03; G03B 15/05
USPC .............. 74/424.71, 424.77, 89.23; 362/319, 362/277, 449, 239
See application file for complete search history.

(56) References Cited

U.S. PATENT DOCUMENTS 3,654,816 A * 4/1972 Beery et al. ................. 74/424.75
4,395,924 A * 8/1983 Callahan ..................... 74/424.74
(Continued)

FOREIGN PATENT DOCUMENTS

JP   3280004 A   12/1991
JP   4136906 A   5/1992
(Continued)

OTHER PUBLICATIONS

PCT International Search Report for PCT/JP2011/003423, dated Jul. 12, 2011.

*Primary Examiner* — Diane Lee
*Assistant Examiner* — Matthew J Peerce
(74) *Attorney, Agent, or Firm* — Dority & Manning, P.A.

(57) ABSTRACT

In a strobe zoom device of an electrically driven feed screw type, to reduce the sound pressure level of zoom operation sound caused by an electrically driven feed screw and to allow strobe imaging to be performed quietly, the electrically driven feed screw for strobe zoom includes: a feed screw rod (30) having a central axis and mounted to a casing (10) so as to be rotatable about the central axis thereof and extend in the fore and aft direction, the feed screw rod including an outer circumferential surface having a screw groove (32) formed thereon; and a wire member (34) attached to a movable body (planar lens plate (12) or a light source box (20)) and including a part wrapped around at least a part of the screw groove (32) so as to be in threaded engagement with the same.

4 Claims, 6 Drawing Sheets

(56) References Cited

U.S. PATENT DOCUMENTS

| | | | | |
|---|---|---|---|---|
| 4,873,542 | A | * | 10/1989 | Nakayama .................... 396/144 |
| 5,878,291 | A | * | 3/1999 | Hagiuda et al. ............... 396/175 |
| 6,513,406 | B1 | * | 2/2003 | Murray et al. .................. 74/523 |
| 7,337,690 | B1 | * | 3/2008 | Devenyi .................... 74/424.77 |
| 2007/0217201 | A1 | * | 9/2007 | Drozdowicz .................. 362/287 |
| 2010/0073783 | A1 | * | 3/2010 | Sun ............................... 359/822 |

FOREIGN PATENT DOCUMENTS

| | | |
|---|---|---|
| JP | H05508719 A | 12/1993 |
| JP | H06272745 A | 9/1994 |
| JP | 2003084340 A | 3/2003 |
| JP | 2006349743 A | 12/2006 |
| JP | 2008090006 A | 4/2008 |

* cited by examiner

STROBE ZOOM DEVICE

FIELD OF THE INVENTION

The present invention relates to a strobe zoom device, and particularly to a strobe zoom device of an electrically driven feed screw type.

BACKGROUND OF THE INVENTION

A strobe zoom device of an electrically driven feed screw type is known in which a light source box disposed in a casing so as to be movable in a fore and aft direction is caused to move in the fore and aft direction by an electrically driven feed screw mechanism to vary a distance along an optical axis between the light source box and a lens disposed in front of the light source box, thereby to vary an illumination angle of strobe light (strobe illumination angle) illuminated onto an object to be imaged.

In the strobe zoom device of the electrically driven feed screw type, a feed screw rod is rotatably mounted to the casing, a female screw member is mounted to the light source box, and a screw thread formed in the female screw member is in threaded engagement with a screw groove formed on the outer circumference of the feed screw rod, whereby a zoom operation is performed when the light source box is moved in the fore and aft direction in response to linear movement of the female screw member caused by rotation of the feed screw rod.

BRIEF SUMMARY OF THE INVENTION

In the strobe zoom device of the electrically driven feed screw type, an operation sound (noise) tends to be generated by sliding between the parts that are in threaded engagement when the feed screw rod is rotated during a zoom operation. Particularly, since the strobe zoom device is typically mounted to a camera and therefore is to be positioned near the head of a person who takes pictures with the camera, the operation sound of the electrically driven feed screw, namely, the zoom operation sound, can be easily heard by the person, and thus, can be disturbing even when the sound pressure level of the operation sound is low.

The task to be accomplished by the present invention is, in a strobe zoom device of an electrically driven feed screw type, to reduce the sound pressure level of zoom operation sound caused by an electrically driven feed screw and to allow strobe imaging to be performed quietly.

A strobe zoom device according to the present invention comprises a light source box disposed in a casing and a lens disposed in front of the casing, such that one of the light source box and the lens serves as a movable body movable in a fore and aft direction, and that an illumination angle of strobe light emitted from the light source box can be varied by moving the movable body in the fore and aft direction, the strobe zoom device further comprising: a feed screw rod having a central axis and mounted to the casing so as to be rotatable about the central axis thereof and extend in the fore and aft direction, the feed screw rod including an outer circumferential surface having a screw groove formed thereon; an electric motor mounted to the casing and configured to rotationally drive the feed screw rod; and a wire member attached to the movable body and including a part wrapped around at least a part of the screw groove so as to be in threaded engagement with the same.

According to this structure, the wire member serves as a female screw member engaging with the feed screw, and the zoom operation sound generated by sliding between the screw groove and the wire member when the feed screw rod is rotated can be absorbed (or deadened) due to absorption of vibration energy by elastic deformation of the wire member.

For the purpose of absorption of the sliding sound, the wire member preferably comprises a spring wire member, which serves as a member having an appropriate elastic deformation property. Spring wire members suitable for the wire member may include those made of spring steel, stainless steel, phosphor bronze, plastic or the like.

In the strobe zoom device according to the present invention, it is preferred that the wire member has an extension end portion at each end of the part that is wrapped around the screw groove, each extension end portion extending in a direction perpendicular to the central axis of the feed screw rod, and having a fastened part fastened to the movable body at an extreme end thereof or at a part adjacent to the extreme end.

According to this structure, elastic deformation of the extension end portions favorably absorbs the vibration energy and thus, favorably reduces the zoom operation sound.

In the strobe zoom device according to the present invention, it is preferred that a restricting portion is formed in a part of the movable body corresponding to a point between the fastened part of each extension end portion and the part of the wire member wrapped around the screw groove to restrict elastic deformation of the extension end portion in a direction of the central axis of the feed screw rod.

According to this structure, while the zoom operation sound is reduced by elastic deformation of the extension end portions, excessive elastic deformation of each extension end portion is prevented even when the feed screw rod is rotated beyond a predetermined number of rotations due to runaway of the electric motor or for any other reason, thereby avoiding undesired release of the wire member from the engagement with the screw groove and detachment of the wire member from the movable body.

In the strobe zoom device according to the present invention, it is preferred that the part of the wire member that is wrapped around the screw groove includes a helical section that is wrapped around the screw groove at least one turn.

According to this structure, the engagement between the wire member and the screw groove brought about by wrapping the wire member around the screw groove is hard to be released, and a stable zoom operation is achieved.

In the strobe zoom device according to the present invention, a wire member serves as a female screw member engaging with the feed screw, and the zoom operation sound caused by sliding between the screw groove and the wire member when the feed screw rod is rotated can be absorbed (or deadened) due to absorption of vibration energy by elastic deformation of the wire member. This reduces the sound pressure level of the zoom operation sound and allows strobe imaging to be performed quietly.

DETAILED DESCRIPTION OF THE INVENTION

Now, with reference to FIGS. 1-5, a description will be give of an embodiment of a strobe zoom device according to the present invention.

Figure 1:
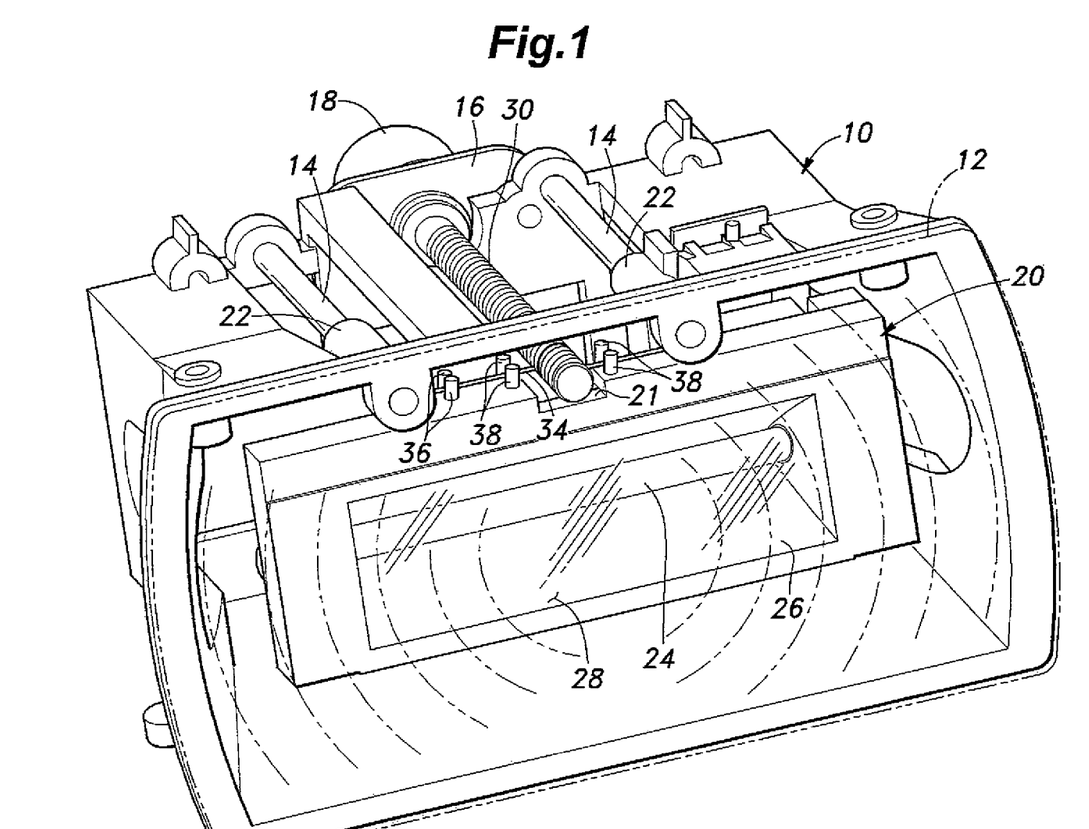
FIG. 1 is a perspective view showing an embodiment of a strobe zoom device according to the present invention.

The strobe zoom device includes a casing 10 made of a synthetic resin and having a parallelepiped box-like shape having a front opening. A planar lens plate 12 constituted of a Fresnel lens is attached to the front part of the casing 10 so as to close the front opening of the casing 10.

A pair of guide bars 14 are attached to the casing 10 so as to extend in a fore and aft direction in parallel with each other. A light source box 20 is disposed in the casing 10. The light source box 20 is made of a synthetic resin, and has a parallelepiped box-like shape having a front opening and being smaller in size than the casing 10. The light source box 20 has a pair of sleeve portions 22 formed integrally on top thereof such that the pair of sleeve portions 22 extend in parallel with each other in the fore and aft direction. The sleeve portions 22 slidably engage with the corresponding guide bars 14. According to this structure, the light source box 20 can undergo, as a movable body, translational movement in the fore and aft direction inside the casing 10.

A linear light source 24, such as a xenon discharge tube, for example, and a concave reflector 26 are mounted in the light source box 20. A light illuminating plate 28 constituted of a light-transmitting plate member is attached to the front of the light source box 20 so as to close the front opening of the light source box 20.

Further, a base portion of a feed screw rod 30 is rotatably mounted to the casing 10 by means of a mount plate 16 secured to the rear portion of the casing 10. The feed screw rod 30 is supported by the mount plate 16 so as to be rotatable about a central axis of its own, and extends in parallel with the guide bars 14 in the fore and aft direction. An electric motor 18 such as a servo motor or the like is mounted to the mount plate 16. The electric motor 18 has a rotor shaft (output rotation shaft) connected directly to the base portion of the feed screw rod 30, though this is not shown in the drawings. According to this structure, the feed screw rod 30 is driven to rotate directly by the electric motor 18.

The feed screw rod 30 has a continuous screw groove 32 (see FIG. 3) formed on the outer circumference surface thereof. The cross-sectional shape of the screw groove 32 may be any of semicircle, trapezoid or V-shape.

Figure 2:
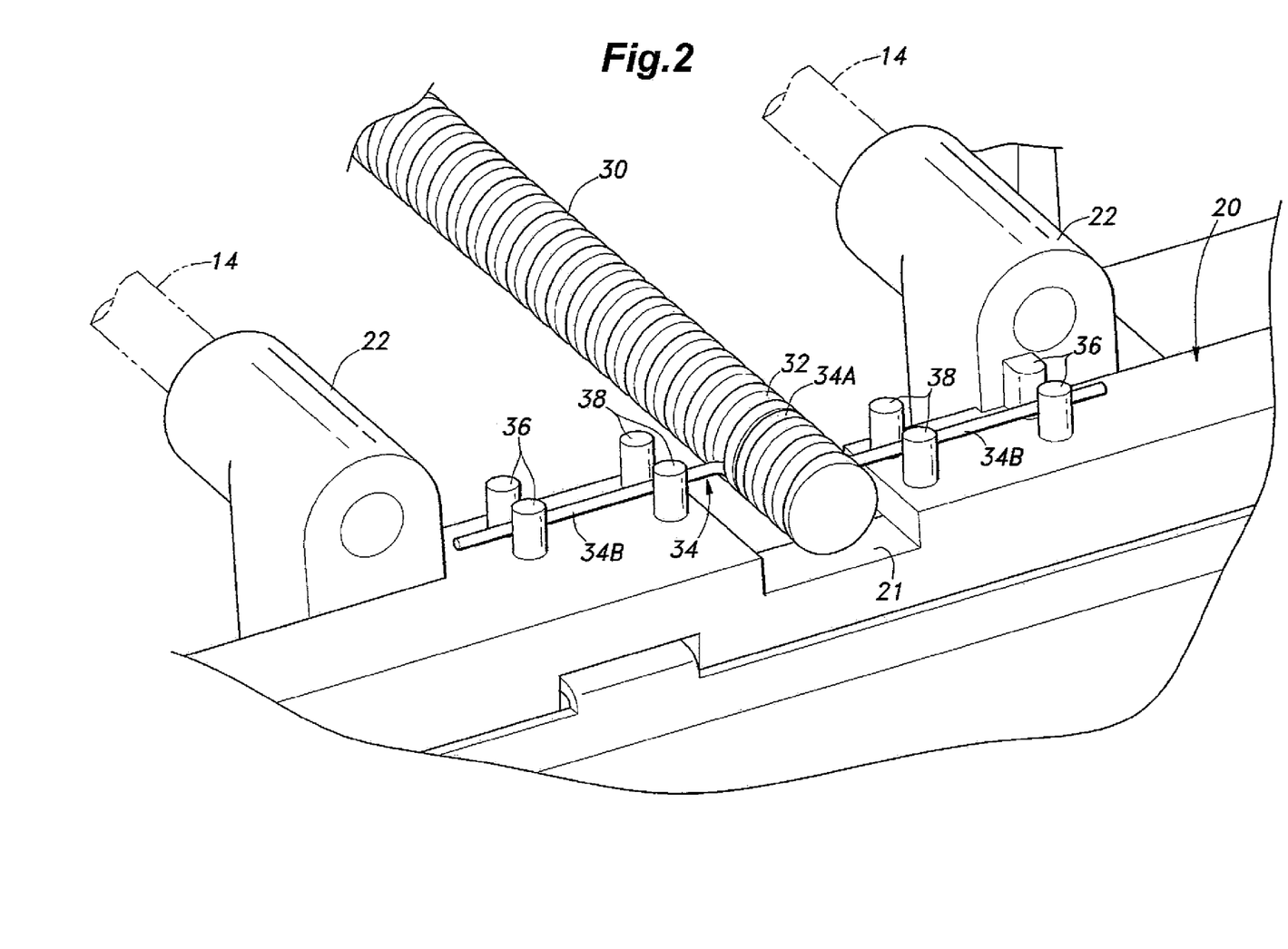
FIG. 2 is an enlarged perspective view of an essential part of the strobe zoom device according to the embodiment.
Figure 4:
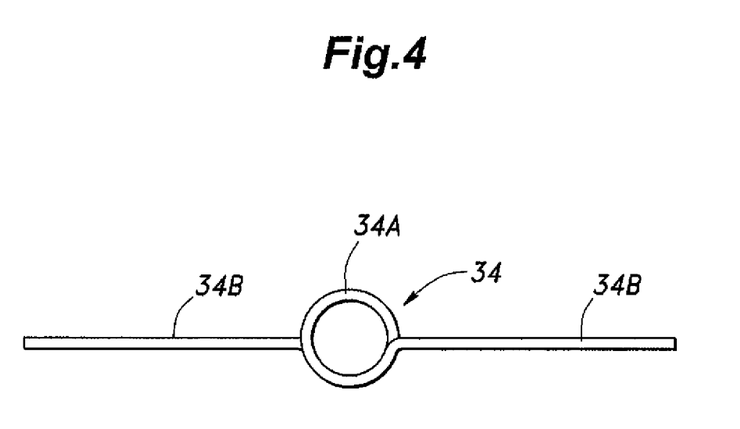
FIG. 4 is a front view showing an example of a wire member used in the strobe zoom device according to the embodiment.
Figure 5:
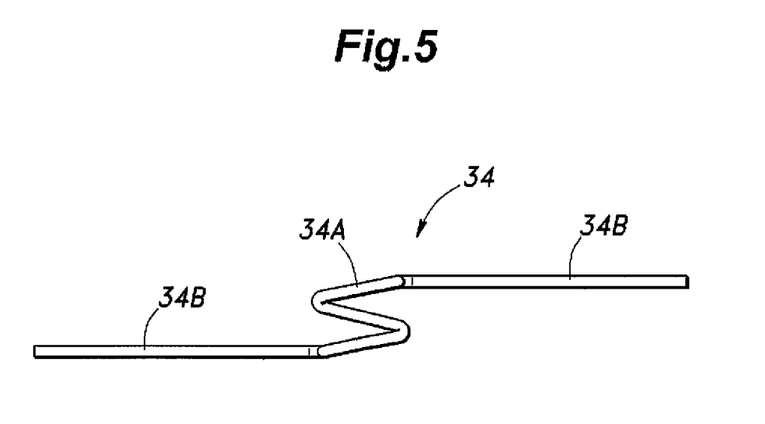
FIG. 5 is a plan view showing an example of a wire member used in the strobe zoom device according to the embodiment.

A wire member 34 is attached to the top of the light source box 20. The wire member 34 includes: a helical section 34A wrapped one and a half turns around the screw groove 32, the helical section 34A serving as a part that is wrapped around the screw groove 32 of the feed screw rod 30 so as to be in threaded engagement with the same; and a pair of left and right extension end portions 34B which extend from respective ends of the helical section 34A in a horizontal direction (left and right direction) perpendicularly to the central axis of the feed screw rod 30 and in a direction intersecting the center of the helical section 34A.

The wire member 34 is constituted in its entirety of a spring wire member having an appropriate elasticity in order to absorb sound generated by sliding between the screw groove 32 and the helical section 34A, which is caused when the feed screw rod 30 is rotated. Spring wire members suitable for the wire member 34 include those made of spring steel, stainless steel, phosphor bronze, plastic or the like.

A recess 21 is formed in the top of the light source box 20 at the center in the left and right direction to avoid interference with the screw rod member 30, and the screw rod member 30 is positioned in this recess 21. A pair of wire engagement protrusions 36 are formed integrally on each of the left and right sides of the recess 21. The wire engagement protrusions 36 in each of the left and right pairs are spaced apart from each other in the fore and aft direction by a distance equal to or slightly smaller than the diameter of the extension end portion 34B, and sandwich in the fore and aft direction a part of the corresponding extension end portion 34B adjacent to the extreme end thereof, thereby fixedly engaging (fastening) the extension end portion 34B to the top of the light source box 20. It is to be noted that this engagement may be performed at the extreme end of the extension end portion 34B.

On each of the left and right sides of the recess 21, a pair of wire movement restricting protrusions 38 are integrally formed at a position between the recess 21 and the corresponding pair of wire engagement protrusions 36. The wire movement restricting protrusions 38 in each of the left and right pairs are spaced apart from each other by a distance larger than the diameter of the extension end portion 34B, and sandwich in the fore and aft direction a part of the corresponding extension end portion 34B between the helical section 34A and the part of the extension end portion 34B fastened to the light source box 20 by the wire engagement protrusions 36, such that front and rear gaps g (see FIG. 3) are defined between the extension end portion 34B and the wire movement restricting protrusions 38.

Figure 3:
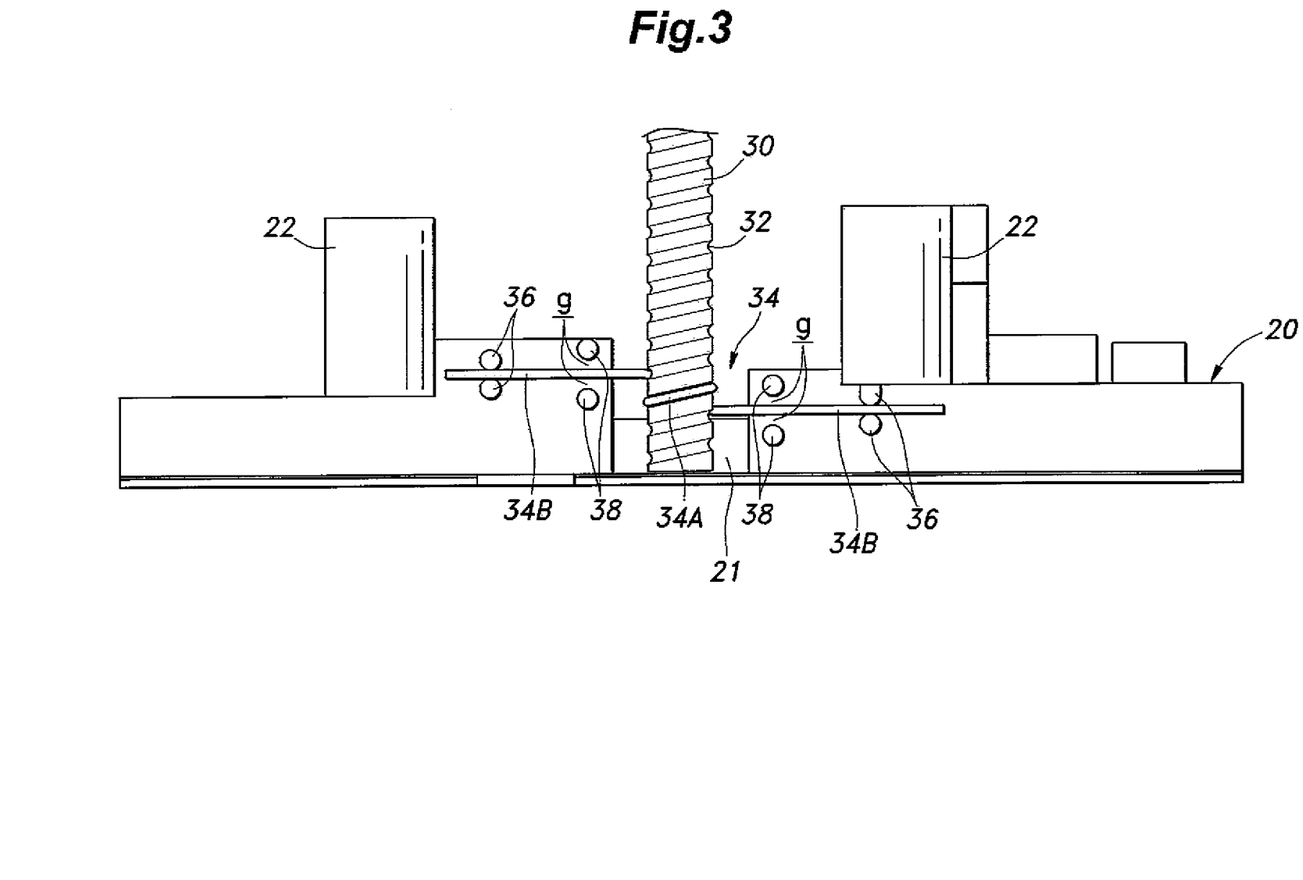
FIG. 3 is a plan view of an essential part of the strobe zoom device according to the embodiment.

According to this structure, each extension end portion 34B is allowed to deform elastically in the fore and aft direction (in the direction of the central axis of the feed screw rod 30) within a range defined by the front and rear gaps g, and is restricted from deforming elastically in the fore and aft direction beyond the range.

In the strobe zoom device having the structure described above, the helical section 34A of the wire member 34 is wrapped around the screw groove 32 of the feed screw rod 30 so as to be in threaded engagement with the same, and therefore, when the feed screw rod 30 is rotationally driven by the electric motor 18, the light source box 20 undergoes translational movement in the fore and aft direction while being guided by the guide bars 14. This movement varies the distance between the light source box 20 and the planar lens plate 12 in the direction of an optical axis, thereby varying the illumination angle of strobe light which is generated by flashing of the linear light source 24 and illuminated through the planar lens plate 12 onto an object to be imaged. This change in the illumination angle of the strobe light is referred to as strobe zoom.

During this strobe zoom operation, as the feed screw rod 30 rotates, the screw groove 32 slides relative to the helical section 34A and the vibration caused by friction between them tends to generate noise; that is, zoom operation sound. However, the vibration causes the wire member 34, particularly the extension end portions 34B thereof, to deform elastically, and this elastic deformation absorbs the vibration energy. This provides a sound absorbing (sound deadening) effect, and lowers the sound pressure level of the zoom operation sound, thereby allowing strobe imaging to be performed quietly.

Further, even when the feed screw rod 30 and the guide bars 14 are not precisely in parallel with each other and/or the feed screw rod 30 is not perfectly straight due to a dimensional accuracy error, an assembly error or the like, elastic deformation of the extension end portions 34B can avoid strained engagement between the feed screw rod 30 and the wire member 34 serving as a female screw member, and thus, generation of abnormal sound due to the strained engagement also can be prevented.

The degree of elastic deformation of each extension end portion 34B is determined by the spring constant of the wire member 34 and the length of a part of the extension end portion 34B between the part thereof connected to the helical section 34A and the part thereof fastened by the wire engagement protrusions 36. In this case, the larger the distance from the helical section 34A to the part of the extension end portion 34B fastened to the light source box 20 is; namely, the larger the length of the part of the extension end portion 34B between the part thereof connected to the helical section 34A and the part thereof fastened by the wire engagement protrusions 36 (effective wire length) is, the more easily the extension end portion 34B can be elastically deformed in response to the aforementioned vibration or to avoid the aforementioned strained engagement, thereby reducing the sound pressure level of the zoom operation sound and preventing the generation of abnormal sound effectively and favorably.

Though a larger effective wire length of the extension end portion 34B can result in easier elastic deformation of the extension end portion 34B, it may lead to a problem that if the feed screw rod 30 is rotated beyond a predetermined number of rotations due to runaway of the electric motor 18 or for any other reason, the extension end portion 34B may be elastically deformed excessively in the fore and aft direction to such an extent that the helical section 34A of the wire member 34 is released from the threaded engagement with the screw groove 32 or the fixed engagement of the wire member 34 to the light source box 20 by means of the wire engagement protrusions 36 is released.

To address this problem, the wire movement restricting protrusions 38 restrict elastic deformation of each extension end portion 34B in the fore and aft direction (the central axis direction of the feed screw rod 30) within the range defined by the front and rear gaps g, thereby preventing the helical section 34A of the wire member 34 from being released from the engagement with the screw groove 32 and preventing the fixed engagement of the wire member 34 to the light source box 20 by means of the wire engagement protrusions 36 from being released.

It is to be noted that the wire movement restricting protrusions 38 allow each extension end portion 34B to be deformed elastically within the range defined by the front and rear gaps g, and therefore, the reduction of the zoom operation sound due to elastic deformation of the extension end portion 34B is not impaired.

In this embodiment, the wire member 34 includes the helical section 34A wrapped around the screw groove 32 one and a half turns to serve as a part that is wrapped around and in threaded engagement with the screw groove 32, and therefore, the threaded engagement between the wire member 34 and the screw groove 32 is less likely to be released, and a stable zoom operation can be achieved. In this point of view, it is preferred that the wire member 34 include a helical section wrapped around the screw groove 32 at least one turn.

Figure 6:
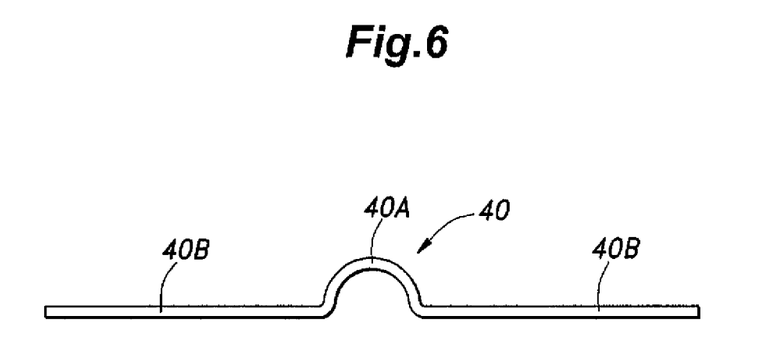
FIG. 6 is a front view showing another example of a wire member used in the strobe zoom device according to the embodiment.

The wire member engaging with the feed screw rod 30 does not necessarily have to include a helical section wrapped around the screw groove 32 one turn, and may be constituted of a wire member 40 including a semicircular section 40A that is wrapped around the screw groove 32 only a half turn. The wire member 40 is only required to include extension end portions 40B, which are equivalent to the extension end portions 34B, at either end of the semicircular portion 40A.

The strobe zoom device according to the present invention is not limited to the type in which the movable body for performing strobe zoom is embodied by the light source box 20 as in the foregoing embodiment, and the present invention may be applied to the type in which the light source box 20 is fixed while the planar lens plate 12 is movable relative to the light source box 20 in the optical axis direction (fore and aft direction) to perform strobe zoom, in which case the planar lens plate 12 serves as a movable body.

Although the present invention has been described in terms of preferred embodiments thereof, the present invention is not limited by the illustrated embodiments, and various alterations and modifications are possible without departing from the spirit of the present invention. Further, not all of the parts shown in the foregoing embodiments are necessarily indispensable, and they may be selectively involved without departing from the spirit of the present invention.

The contents disclosed in the Japanese patent application (Japanese Patent Application No. 2010-208861 filed on Sep. 17, 2010) on which the Paris Convention priority claim is made for the present application are incorporated herein in its entirety by reference. The contents of the original Japanese patent application on which the Paris Convention priority claim is made for the present application, as well as the contents of any prior art references mentioned in the disclosure of the present application, are incorporated herein in their entirety by reference.

GLOSSARY 10 casing
12 planar lens plate
14 guide bar
18 electric motor
20 light source box
24 linear light source
30 feed screw rod
32 screw groove
34 wire member
34A helical section
34B extension end portion
36 wire engagement protrusion
38 wire movement restricting protrusion

The invention claimed is:

1. A strobe zoom device comprising a light source box disposed in a casing and a lens disposed in front of the casing, such that one of the light source box and the lens serves as a movable body movable in a fore and aft direction, and that an illumination angle of strobe light emitted from the light source box is varied by moving the movable body in the fore and aft direction, the strobe zoom device further comprising:
  a feed screw rod having a central axis and mounted to the casing so as to be rotatable about the central axis thereof and extend in the fore and aft direction, the feed screw rod including an outer circumferential surface having a screw groove formed thereon;
  an electric motor mounted to the casing and configured to rotationally drive the feed screw rod; and
  a wire member attached to the movable body and including a part wrapped around at least a part of the screw groove so as to be in threaded engagement with the same,
  wherein the wire member has an extension end portion at each end of the part that is wrapped around the screw groove, each extension end portion extending in a direction perpendicular to the central axis of the feed screw rod, and having a fastened part fastened to the movable body at a tip end of each extension end portion or at a part adjacent to the tip end of each extension end portion, wherein a restricting portion is formed in a part of the movable body corresponding to a point between the fastened part of each extension end portion and the part of the wire member wrapped around the screw groove, the restricting portion sandwiching the extension end portion in the fore and aft direction such that front and rear gaps are defined between the extension end portion and the restriction portion, the restricting portion allowing the extension rod portion to deform elastically in the fore and aft direction within a range defined by the front and rear gaps and restricting elastic deformation of the extension end portion in the fore and aft direction beyond the range defined by the front and rear gaps.

2. The strobe zoom device according to claim 1, wherein the part of the wire member that is wrapped around the screw groove includes a helical section that is wrapped around the screw groove at least one turn.

3. The strobe zoom device according to claim 1, wherein the wire member comprises a spring wire member.

4. The strobe zoom device according to claim 1, wherein the restricting portion includes a pair of protrusions provided to the movable body to sandwich the extension end portion in the fore and aft directions.

* * * * *